(12) United States Patent
Luttway et al.

(10) Patent No.: US 6,474,664 B1
(45) Date of Patent: Nov. 5, 2002

(54) STROLLER STAND

(75) Inventors: Dana Lowey Luttway, 49 E. 86th St., New York, NY (US) 10028; Matthew T. Hayduk, Glen Cove, NY (US)

(73) Assignees: Dana Lowey Luttway, New York, NY (US); Mathew T. Hayduk, New York, NY (US)

( * ) Notice: Subject to any disclaimer, the term of this patent is extended or adjusted under 35 U.S.C. 154(b) by 0 days.

(21) Appl. No.: 09/670,901

(22) Filed: Sep. 28, 2000

Related U.S. Application Data

(60) Provisional application No. 60/156,562, filed on Sep. 28, 1999.

(51) Int. Cl.[7] .................................................. B62B 9/00
(52) U.S. Cl. ............................... 280/47.38; 280/47.33; 280/293; 248/354.1; 248/688
(58) Field of Search ......................... 280/293, 298, 280/642, 657, 47.33, 297, 304, 47.131; 248/354.1, 354.5, 354.6, 354.7, 688, 689, 690, 96, 97, 98, 129, 133, 454, 456, 460, 169, 163.1, 165, 166, 168, 170, 439

(56) References Cited

U.S. PATENT DOCUMENTS

| | | | | |
|---|---|---|---|---|
| 1,143,780 A | * | 6/1915 | Pinto | 280/298 |
| 1,181,007 A | * | 4/1916 | Henneberg | 248/96 |
| 2,227,460 A | * | 1/1941 | Morgensen, Jr. | 254/1 |
| 2,374,021 A | * | 4/1945 | Korling | 248/411 |
| 2,588,399 A | * | 3/1952 | McQuin | 182/20 |
| 3,330,421 A | * | 7/1967 | Simmons | 280/765.1 |
| 3,893,687 A | * | 7/1975 | Victor | 280/47.27 |
| 4,324,477 A | * | 4/1982 | Miyazaki | 248/163.1 |
| 4,832,296 A | * | 5/1989 | Schnepp | 248/168 |
| 5,794,899 A | * | 8/1998 | Tamllos | 248/166 |

* cited by examiner

Primary Examiner—Brian L. Johnson
Assistant Examiner—Christopher Bottorff
(74) Attorney, Agent, or Firm—Chadbourne & Parke, LLP

(57) ABSTRACT

The present invention relates to a stroller stand for preventing a stroller from tipping over backward. The stroller stand is designed for lightweight, foldable strollers known as "umbrella" strollers. Strollers often tip over backward when a child is removed from the stroller seat before bags or packages present weighing on the stroller handles are removed. The stroller stand consists of an elongated member or stand that is attached to the stroller and folds up to a stored position that is flush with the frame of the stroller. When deployed, the stroller stand extends diagonally from the back of the stroller and touches the ground, acting to counterbalance any additional weight of the handles of the stroller. The stroller stand is lightweight and attaches to various types of stroller frames with customized adapters.

6 Claims, 5 Drawing Sheets

STROLLER STAND

The present application is based on and claims priority from U.S. Provisional Patent Application Ser. No. 60/156,562 filed Sep. 28, 1999.

FIELD OF THE INVENTION

The present invention relates to an accessory for preventing a stroller from tipping over due to an imbalance in weight on the stroller.

BACKGROUND OF THE INVENTION

Strollers, especially folding strollers, have a tendency to tip over backward when force is exerted on the handles of the stroller that is not counterbalanced by force in the seat of the stroller. Often, packages and bags that are hooked onto the handles while a child is in the stroller seat will cause the stroller to tip over backward when the child is removed from the seat before the bags are removed.

An existing approach to solving this problem involves adding counter-weights near the front wheels of the stroller to oppose the force of the packages on the handles. The disadvantage to this approach, however, is that the weights must be relatively heavy in order to prevent the stroller from tipping over, thereby adding to the overall weight of the stroller. In the case of umbrella strollers that are designed to be folded and carried, extra weight is undesirable from a portability standpoint.

Accordingly, there exists a need for a practical, lightweight device that would prevent a stroller from tipping over backwards when a child is removed from the stroller seat and packages or bags continue to exert a force on the stroller handles.

It is therefore an object of the invention to provide a lightweight device that attaches to a stroller and can prevent the stroller from tipping over backward;

It is a further object of the invention that the device not interfere with the normal operation, including folding and unfolding, of a stroller;

It is a further object of the invention that the device be mountable on different types of strollers;

It is a further object of the invention that the device be deployable only when needed to support the stroller.

SUMMARY OF THE INVENTION

In accordance with these and other objects, the stroller stand of the present invention comprises an elongated member that is designed to be attached to a stroller to prevent the stroller from tipping over backward. The stroller stand can be attached to a stroller and remain attached to the stroller without interfering with its normal operation, folding, or unfolding. In a preferred embodiment of the present invention, the stroller stand comprises a telescoping elongated member that may be made of metal or any other suitably rigid material, which is attachable to the frame of a stroller. The elongated member can be attached to the frame of a stroller without interfering with other parts of the stroller.

Once attached, the elongated member can be easily moved between a stored position and a deployed position. In its stored position, the elongated member rests parallel to the frame of the stroller and is releasably secured to the restraining member attached to the stroller. In this position, the stroller can be folded and unfolded, and other accessories attached, without interference from the stroller stand. The elongated member can be deployed by releasing it from the restraining member, pivoting the elongated member away from the stroller, then telescoping the elongated member until the end of the elongated member rests on the ground. In its deployed position, the elongated member forms a diagonal between the stroller and the ground, preventing the stroller from tipping backwards as it may be inclined to do due to weight on the handlebars of the stroller. The elongated member can be deployed, for example, before removing a child from the stroller seat when bags and packages are hung on the stroller handlebars. The elongated member will prevent the stroller from tipping backwards as it otherwise might do due to the imbalance caused by removing the weight of the child from the stroller seat.

DETAILED DESCRIPTION

Figure 1:
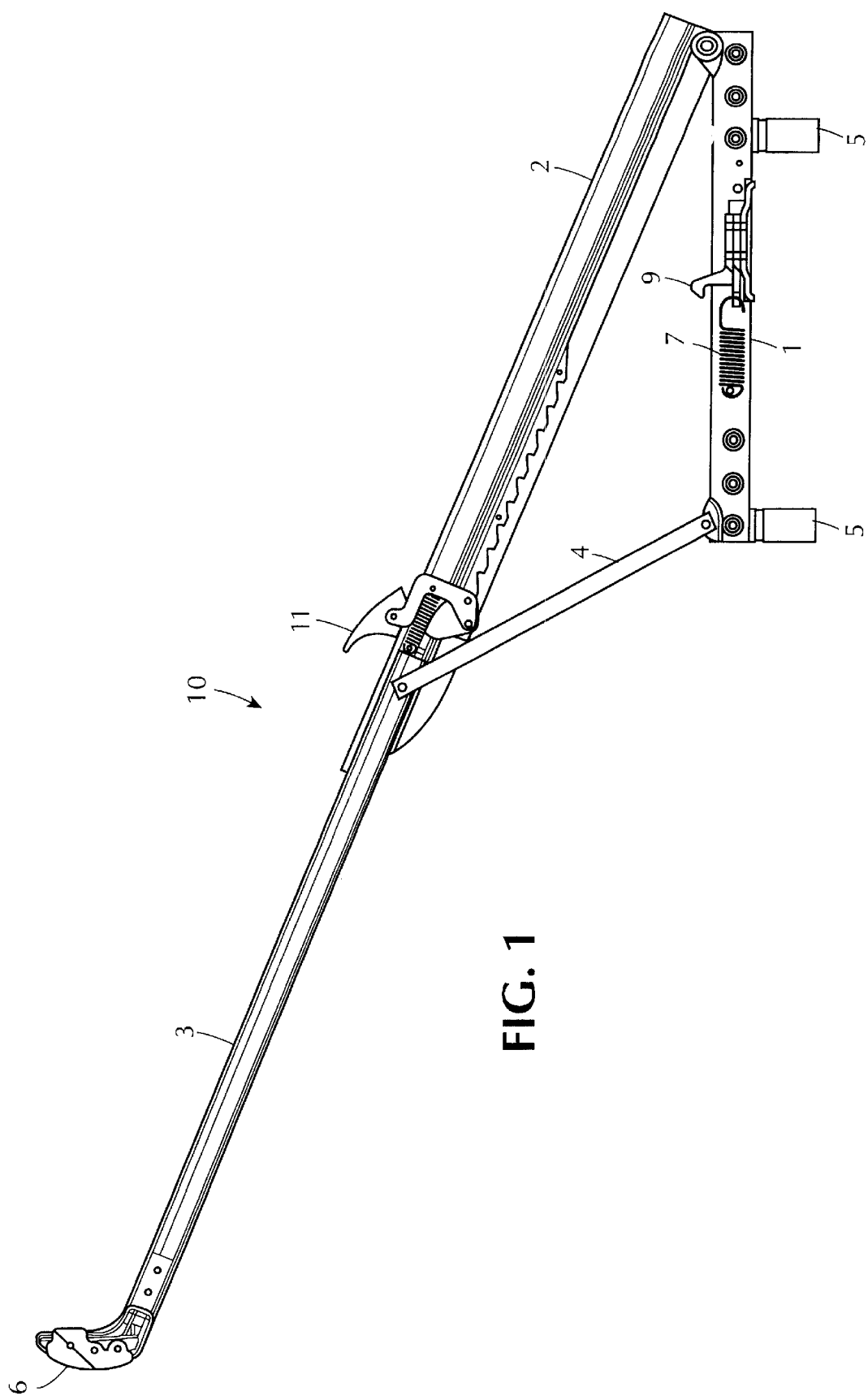
FIG. 1 shows an embodiment of the stroller stand in its extended position.
Figure 2:
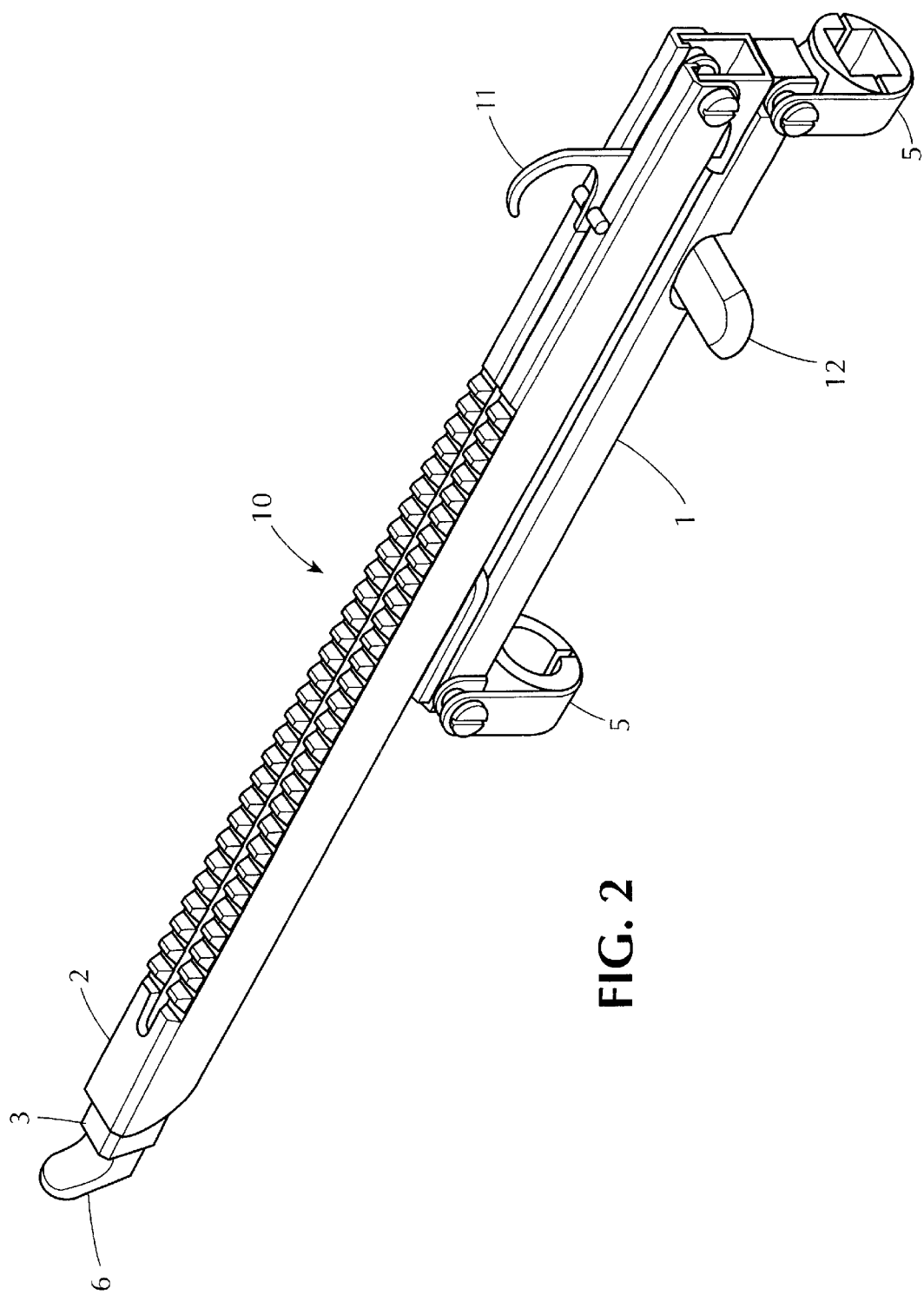
FIG. 2 shows an embodiment of the stroller stand in its retracted position.
Figure 3:
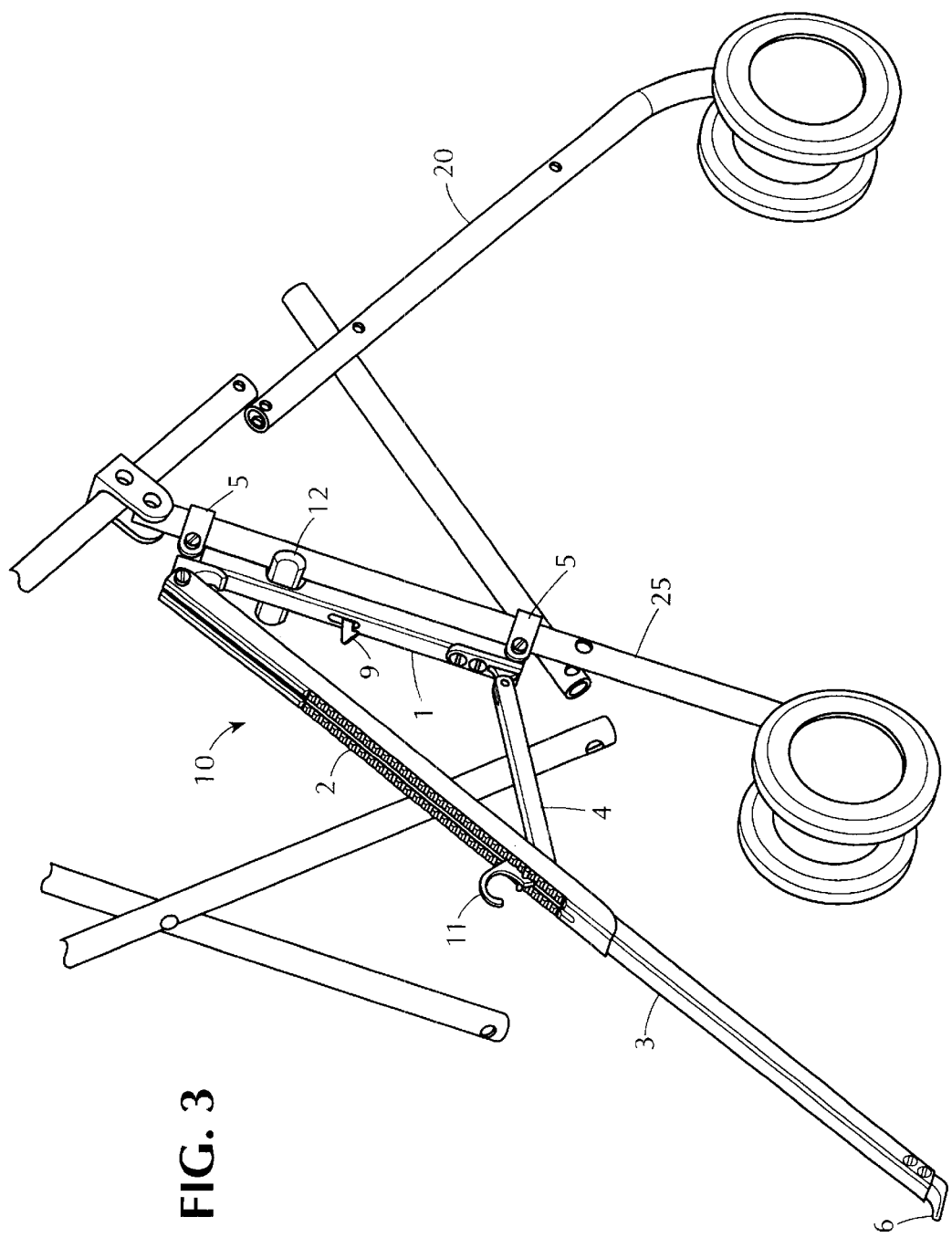
FIG. 3 shows an embodiment of the stroller stand in its extended position attached to a stroller.

The stroller stand 10 shown in FIG. 1 is made up of a frame 1, two elongated members 2,3 that form the stand that supports the stroller 20 and prevent it from tipping over and a cross-member 4 that joins the frame 1 and the two elongated members 2,3. An abutment 6 acts as a foot for the stroller stand 10 and rests on the ground. The stroller stand 10 may be made of metal, plastic or any other suitable material. In the stroller stand's 10 extended position shown in FIG. 1, the two elongated members 2,3 are extended diagonally away from the frame, and are retained at a fixed distance from the frame 1-by locking the cross-member 4 into place by the adjustment lever 11. The stroller stand 10 can be moved to a retracted position as shown in FIG. 2 by pulling the adjustment lever 11, which is attached to cross member 4 and sliding the elongated member 3 into elongated member 2, thereby releasing the cross-member 4 so that it slides into the elongated member 2 . The stroller stand's 10 frame 1 is affixed to the stroller 20 by means of one or more connector elements 5 shown in FIG. 3.

The stroller stand 10 is suited for folding strollers, also known as "umbrella" strollers, because they have the greatest tendency to tip backwards. It may also be used, however, for certain non-folding strollers, depending on their design. The stroller stand 10 is versatile in that it can be adapted to various types of strollers merely by changing the one or more connectors 5. While it is easily deployed from its retracted position by tugging on the release lever 12, the stroller stand 10 is held in the retracted position by a hook 9 in the frame 1, which is attached to a spring 7 that provides resistance to the hook 9, preventing the elongated members 2 and 3 from accidentally detaching from the frame 1.

The stroller stand 10 is adaptable to different types of strollers 20. The one or more connector elements 5 can be changed to accommodate various shapes and sizes of stroller 20 legs 25. The stroller stand 10 is shown in its extended position attached by means of one or more connector elements 5 to a stroller leg 25. As shown, the stroller 20 is supported by the stroller stand 10 and prevented from tipping over by, for example, weight present on the handles of the stroller 20. Thus, when a child is removed from the stroller seat and weight in the form of packages or bags, for example, are on the handles of the stroller 20, the stroller stand 10 will retain the stroller 20 upright and prevent it from tipping over backward.

Figure 4:
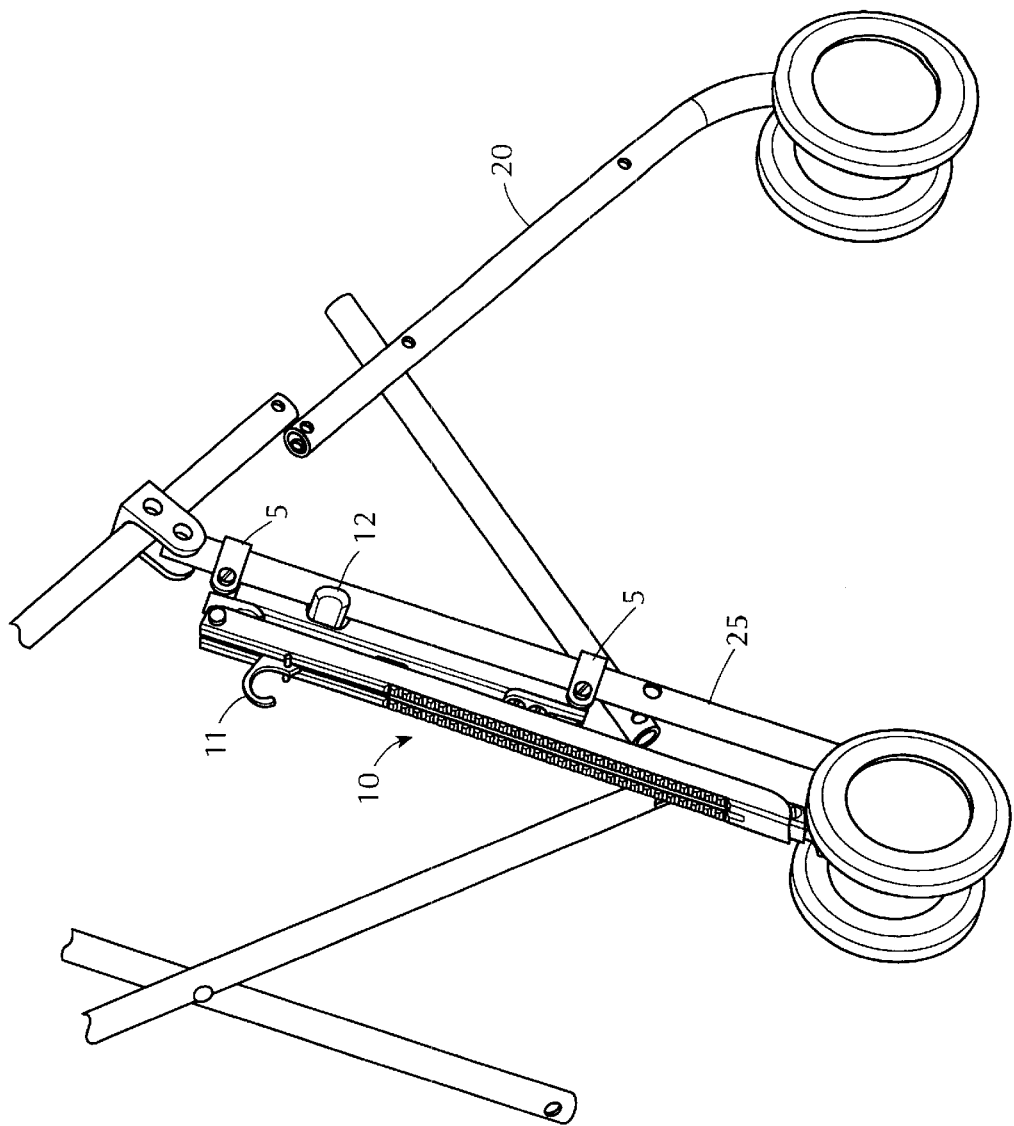
FIG. 4 shows an embodiment of a stroller stand in its retracted position attached to a stroller.

FIG. 4 shows the stroller stand 10 in its retracted position abutting the stroller leg 25. The frame 1 is attached to the stroller by means of the one or more connector elements 5. As shown in FIG. 4 in its retracted position, the stroller stand 10 lies flush on the stroller leg 25, without interfering with the normal operation of the stroller, including the folding and unfolding of the stroller. Additionally, the stroller stand 10 as an accessory to the stroller 20 adds relatively little weight to the stroller 20.

Figure 5:
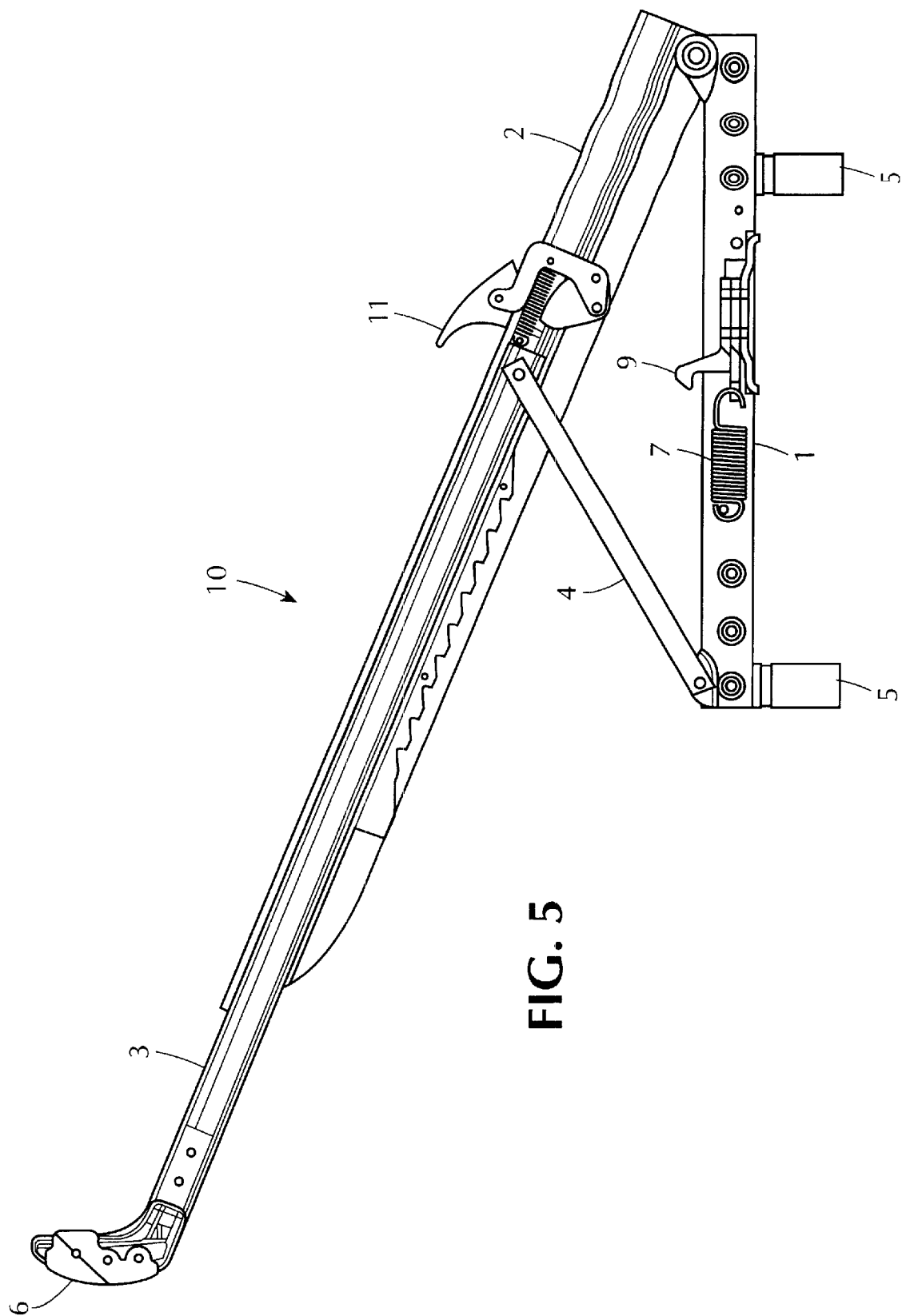
FIG. 5 shows an embodiment of a stroller stand in a position halfway between the extended position and the retracted position.

FIG. 5 shows the stroller stand 10 halfway between the extended position and retracted position. Cross member 4, slides into the first elongated member 2 as the second elongated member 3 also at least partially slides into the first elongated member 2. The adjustment lever 11 is depicted in the released position thereby allowing the cross-member 4 to dislodge from the extended position and move towards the retracted position.

We claim:

1. A stroller stand, comprising a first elongated member having a first end and a second end;

a second elongated member slidably attached to said first member at said second end of said first member, said second member being disposed at least partially within said first member;

a frame having a first end and a second end, said first end of said frame pivotally mounted to said first end of said first member;

a cross-member having a first end and a second end, said first end of said cross-member pivotally mounted on said second end of said frame, said second end of said cross-member mounted on said second member adjacent to the junction of said second member and said first member when the stroller stand is in the extended position, and said second end of said cross-member slidably connected to said first member, such that said second end of said cross-member is slidable into said first member.

2. The stroller stand of claim 1, said frame further comprising a hook mounted on said frame for releasably retaining said first elongated member and said second elongated member against said frame.

3. The stroller stand of claim 2, wherein said hook is attached to a spring affixed to said frame.

4. The stroller stand of claim 1, wherein said second elongated member has an abutment at one end thereof, said abutment extending roughly perpendicular to said second elongated member.

5. The stroller stand of claim 1, said frame further comprising one or more connector members for attaching said frame to the leg of a stroller.

6. The stroller stand of claim 5, wherein said one or more connector members can be different sizes and shapes to enable attachment of said frame to different stroller types.

* * * * *